United States Patent [19]

Zetts et al.

[11] Patent Number: 6,049,329
[45] Date of Patent: Apr. 11, 2000

[54] METHOD OF AND SYSTEM FOR FACILITATING USER INPUT INTO A SMALL GUI WINDOW USING A STYLUS

[75] Inventors: John Mark Zetts, Falls Church, Va.; Maurice Roger Desrosiers, Melbourne, Fla.

[73] Assignee: International Business Machines Corpoartion, Armonk, N.Y.

[21] Appl. No.: 08/657,496

[22] Filed: Jun. 4, 1996

[51] Int. Cl.$^7$ ..................................................... G06K 9/78
[52] U.S. Cl. .......................... 345/179; 345/173; 382/181; 178/18.01
[58] Field of Search .................................. 345/156–157, 345/173, 179, 358, 961; 382/189, 187, 186, 181, 229; 178/18.03, 19.01

[56] References Cited

U.S. PATENT DOCUMENTS

| | | | |
|---|---|---|---|
| H997 | 11/1991 | Broson | 364/521 |
| 5,252,951 | 10/1993 | Tannenbaum et al. | 345/156 |
| 5,276,794 | 1/1994 | Lamb, Jr. | 395/149 |
| 5,361,310 | 11/1994 | Ishigaki | 382/13 |
| 5,390,281 | 2/1995 | Luciw et al. | 395/12 |
| 5,404,458 | 4/1995 | Zetts . | |
| 5,455,901 | 10/1995 | Friend et al. | 395/149 |
| 5,477,447 | 12/1995 | Luciw et al. | 364/419.08 |
| 5,850,477 | 12/1998 | Takada | 382/189 |
| 5,864,636 | 1/1999 | Chisaka | 382/189 |

FOREIGN PATENT DOCUMENTS

| | | |
|---|---|---|
| 7-261916 | 10/1995 | Japan . |
| 09022445A | 1/1997 | Japan . |
| 0922445 | 1/1997 | Japan . |
| 2197168A | 5/1988 | United Kingdom . |

OTHER PUBLICATIONS

*IBM Technical Disclosure Bulletin,* vol. 36, No. 8, Aug. 1993, pp. 85–86, "Small Window for Editing by Pen on Handwriting Input".

*IBM Technical Disclosure Bulletin,* vol. 38, No. 9, Sep. 1995, pp. 461, "Data Interpretation Techniques for a Pen–Based Computer".

Primary Examiner—Bipin Shalwala
Assistant Examiner—David L. Lewis
Attorney, Agent, or Firm—John E. Jobe; Andrew J. Dillon

[57] ABSTRACT

A method of and system for facilitating stylus input into a text entry field in a pen-based computer system. The system detects a touch down of a stylus and determines whether the touch down is in a text entry field. Upon detection of movement of the stylus in the text entry field greater than a threshold, the system draws an include rectangle around the text entry field. The system sizes the include rectangle based on the size of the text entry field. The system interprets and completely inks any stroke of the stylus starting within the include rectangle within a predetermined timeout as an input to the text entry field. The system erases the include rectangle whenever it detects a stylus touch down outside the include rectangle, or the predetermined timeout expires without the system detecting a stylus touch down.

38 Claims, 15 Drawing Sheets

METHOD OF AND SYSTEM FOR FACILITATING USER INPUT INTO A SMALL GUI WINDOW USING A STYLUS

BACKGROUND OF THE INVENTION

1. Technical Field

The invention broadly relates to data processing systems. The invention has particular application in a multitasking pen computer system in which a user enters hand printed character and symbols using a stylus to be interpreted as text and gesture commands.

2. Description of the Prior Art

Pen computers are a class of computers that employ a stylus and sensor as an input device. A pen software subsystem, executing as an adjunct to the operating system, processes pen input for the purposes of recognizing stylus input as mouse input commands, hand printed characters (text) or hand printed symbols known as gestures.

The pen subsystem of the OS/2 operating system permits users to write characters directly into a graphical user interface (GUI) window that are subsequently sent to a gesture and handwriting recognition engine for recognition. By default, the system treats the hand printed shapes as gestures unless the window is one that accepts text, such as an edit field or a text entry window. A key requirement of the pen operating system is to facilitate pen input into all applications that are executed by the user, most of which are unaware of the presence of the stylus and the function rich programming interface provided by the pen subsystem. To implement ease of use and good human factors, it is incumbent upon the pen subsystem to make these pen-unaware applications look and feel, from a user interface point of view, like the applications that are pen-aware and take advantage of the pen functionality.

A problem facing users of pen-based computers is applications often display windows that solicit the user to input a large number of various parameters. Good human factors dictate that the application query as much information as possible without requiring the user to navigate multiple windows, so several input fields are painted into the main application window. Given that the user will input via a keyboard or mouse, the sizes of the fields are dictated solely by aesthetics and the legibility of the character fonts. When using a stylus, however, these numerous small windows make handwriting input difficult at best.

Unlike keyboard and mouse applications, when designing pen-based applications, good human factors dictate that the graphical user interface generally emulate pen and paper. That implies that the user be permitted to enter handwritten text directly into the target input fields. Whereas a pen application developer would allow for larger input windows to facilitate handwriting input, many existing applications do not. Therefore a key objective of the pen operating systems is to allow pen input in existing applications written specifically for the keyboard and mouse.

To unconstrain the user, the user must be allowed to write outside the targeted input window. This is highly desirable in that the user is unencumbered and may write in his own natural style. However, once the user begins to write into an entry field, a mode is entered in which all handwriting input is directed to that particular entry field, regardless of where on the display it is written. This precludes the user from progressing easily to another entry field. In order to direct handwriting input into the next field, the user must terminate the current writing mode, which requires the user to either, 1) stop writing for 3 seconds or, 2) to lift the stylus out of the proximity region of the digitizing sensor. While these actions may not seem overly burdensome, they have a debilitating effect on the user interface.

In existing pen operating systems, the user is given a certain amount of area around the entry field into which the user may extend the handwriting. For example, the allowable area may extend ½ inch above and below the field. Any stroke that starts outside this field is either ignored or terminates the current mode of collecting strokes. There is no indication of where the writing boundaries are. The user gets a rough idea of the boundary because the system clips the ink to the allowable writing area. But the human factors are not good because the user becomes concerned with squeezing the strokes into an allotted area that cannot be seen. In addition, the fact that strokes outside the area are not painted leaves the user unsure of the actual shape and size of the characters. This causes handwriting recognition accuracy to suffer accordingly.

Further information on these operations may be in U.S. Pat. No. 5,252,951 by Alan Tannenbaum et al entitled "Graphical User Interface with Gesture Recognition in a Multi-Application Environment", assigned to the IBM Corporation and incorporated herein by reference.

Also disclosed is IBM Technical Disclosure Bulletin, Vol. 38 No. 09, Pages 461–62, September 1995, entitled, "Data Interpretation Techniques for a Pen-based Computer" and incorporated herein by reference.

Also disclosed is U.S. Pat. No. 5,404,458 by John M. Zetts entitled, "Recognizing the Cessation of Motion of a Pointing Device on a Display By Comparing a Group of Signals to an Anchor Point" and incorporated herein by reference.

It is therefore an object of the present invention unconstrain the user by allowing the user to write outside the targeted input field.

It is a further object of the present invention to aid the user by providing a visual prompt to indicate the area in which all strokes must start.

It is a further object of the present invention to constrain only the touchdown or first point of each stroke while allowing the user to extend strokes beyond the bounds of the visual prompt, so as not to hinder the user's natural writing.

It is a further object of the present invention to enable the user to start writing immediately in other fields.

SUMMARY OF THE INVENTION

Briefly stated the foregoing and other objects are accomplished by the present invention, in which a method and system are provided for facilitating stylus input into a text entry field in a pen-based computer system. The system detects a touch down of a stylus and determines whether the touch down of the stylus is in a text entry field. Upon detection of movement of the stylus in the text entry field greater than a threshold, the system draws an include rectangle around said text entry field.

The system sizes the include rectangle based on the size of the text entry field. Whenever the x-axis size of the text entry field is less than a predetermined x-axis size, the system sizes the x-axis of the include rectangle substantially equal to the predetermined x-axis size. Whenever the y-axis size of the text entry field is less than a predetermined y-axis size, the system sizes the y-axis of the include rectangle substantially equal to the predetermined y-axis size. Whenever either the x-axis or y-axis size of the text entry field is not less than the respective predetermined x-axis or y-axis size, the system sizes the corresponding axis of the include rectangle substantially equal to size of the text entry field that is not less than the predetermined size. Whenever both the x-axis size and the y-axis size of the text entry field are larger than the predetermined x-axis and y-axis sizes, the system suppresses the include rectangle. The predetermined x-axis and y-axis sizes may be user settable.

The system interprets and completely inks any stroke of the stylus starting within the include rectangle within a predetermined timeout as an input to the text entry field. The system erases the include rectangle whenever it detects a stylus touch down outside the include rectangle, or the predetermined timeout expires without the system detecting a stylus touch down.

BRIEF DESCRIPTION OF THE DRAWINGS

These and other objects in the features of the invention will be better understood by reference to the attached drawings and the following descriptions.

DETAILED DESCRIPTION OF THE PREFERRED EMBODIMENT

Figure 1:
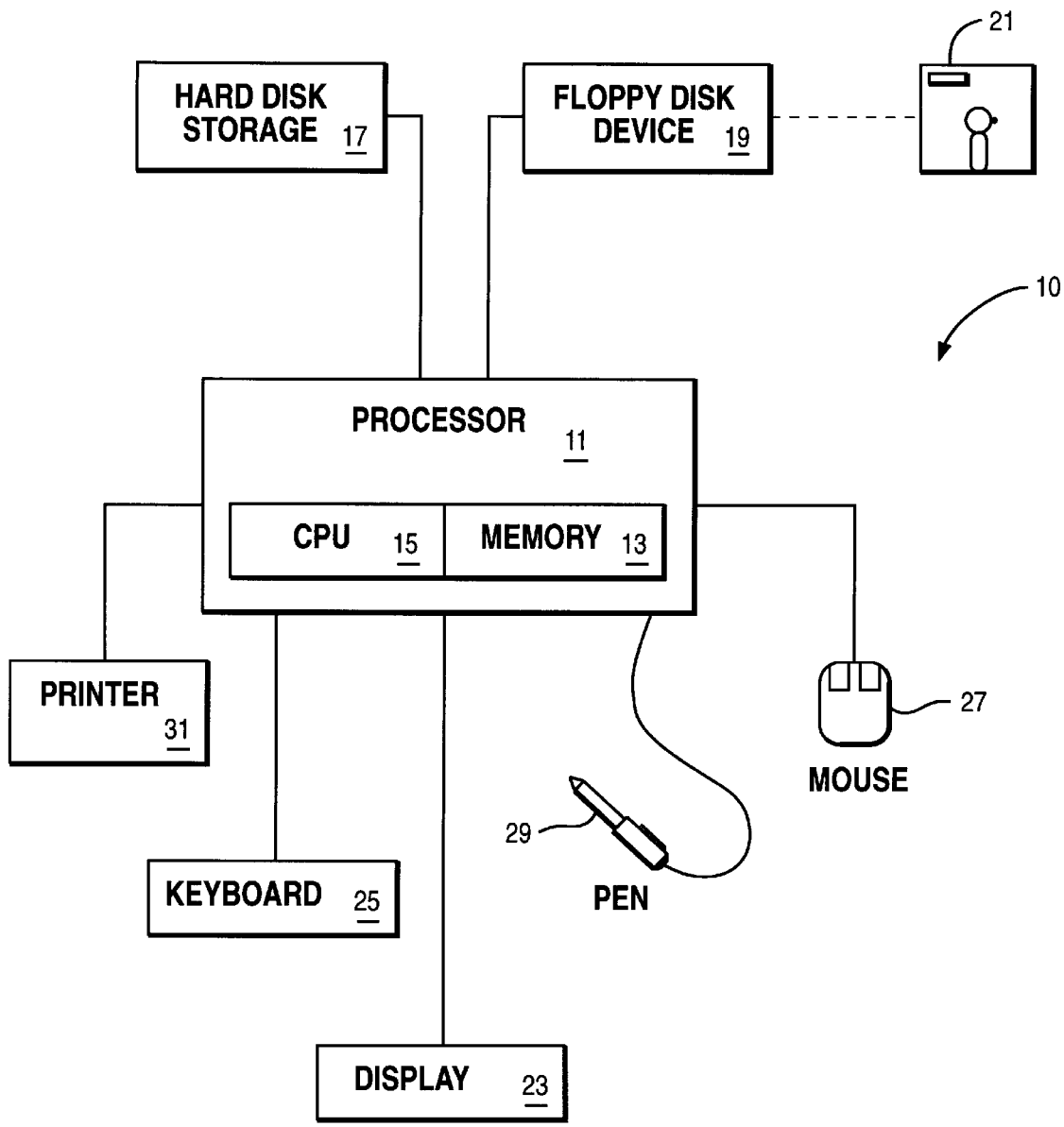
FIG. 1 is a hardware block diagram of a computer system according to the present invention.

Referring now to the drawings, and first FIG. 1, a hardware block diagram of a personal computer system with which the system and method of the present invention may be implemented is designated generally by the numeral 10. System 10 includes processor 11, which includes a central processing unit (CPU) 13 and random access memory 15. System 10 preferably also includes additional memory in the form of a hard disk storage device 17 and a floppy disk device 19. Floppy disk device 19 is adapted to receive a diskette 21 on which may be recorded software for programs, including a software implementation of the present invention. System 10 also includes user interface hardware devices including a display 23, a keyboard 25, a mouse 27, and a pen or stylus 29. System 10 preferably includes a printer 31.

Figure 2:
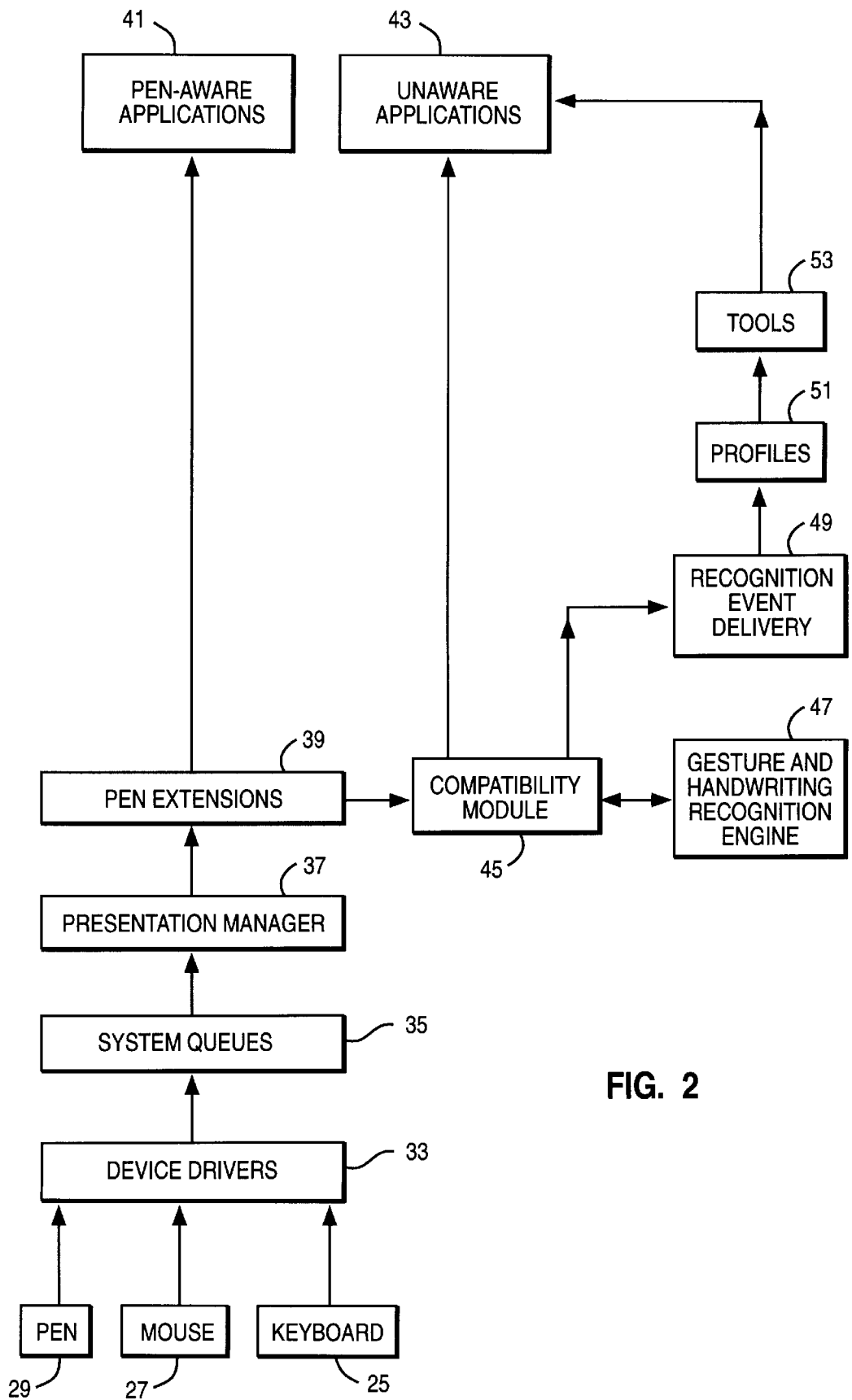
FIG. 2 is architectural block diagram of the major software components of the present invention.

Referring now to FIG. 2, there is illustrated a high level diagram of the major software system components of the pen-based system of the present invention. At the bottom of FIG. 2, the output signals from pen 29, mouse 27, and keyboard 25 are connected to device drivers 33, which are modules that provide low-level I/O support to their respective devices. Device drivers 33 put events into system queues 35. The events in system queues 35 are subsequently processed by a presentation manager 37 which then routes pen and mouse events to pen extensions 39 for processing.

A typical system includes both pen-aware applications 41 and pen-unaware applications 43. Pen-aware applications have the native capacity to recognize and process pen input. Pen-unaware applications are those that have the native capacity only to recognize and process keyboard and/or mouse input. Therefore, pen extensions 39 routes pen events directly to pen-aware applications 41. However, since pen-unaware applications 43 are not capable of using pen functionality, the system includes a compatibility module 45.

Compatibility module 45 acts as a pen-aware application on behalf of pen-unaware applications. If, for example, the user inputs handwritten character events to a pen-aware application, pen extensions 39 routes those events to compatibility module 45, which in turn routes all pen strokes to the gesture and handwriting recognition engine 47. Gesture and handwriting recognition engine 47 processes the pen stroke events and returns a recognition result to the compatibility module 45.

If the recognition event is a gesture, compatibility module 45 routes it to a recognition event delivery subsystem 49, which accesses profiles 51 set up for the user to determine what actions to perform in a pen-unaware application in response to a particular gesture. Optionally, some tools 53 may be invoked to perform some action on the pen-unaware application 43. If the recognition result returned to compatibility module 45 is recognized as handwriting, the resultant text string is routed directly to the appropriate pen-unaware application 43.

Figure 3:
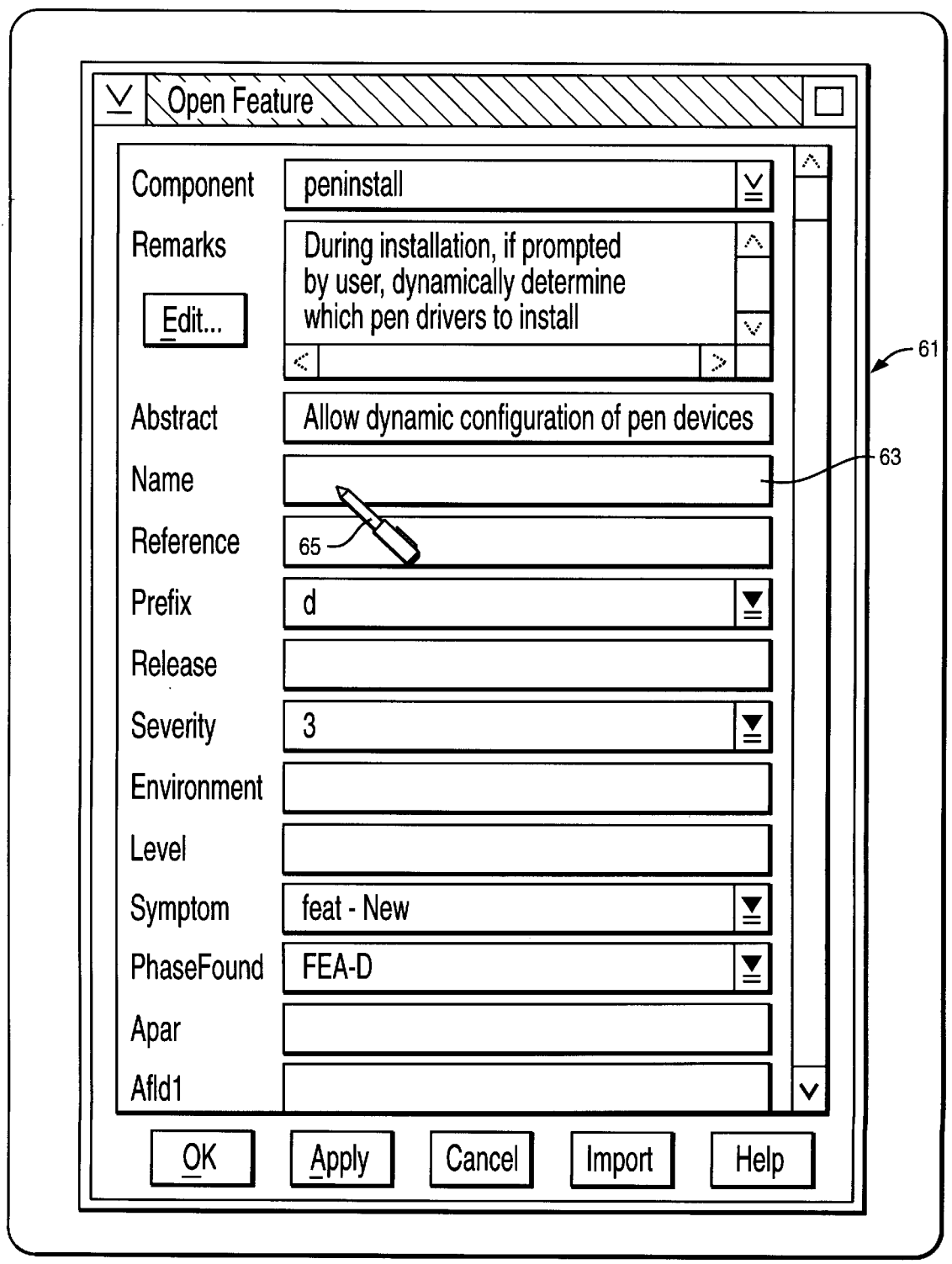
FIGS. 3–6 are pictorial views of a window with many, closely spaced text entry fields illustrating a preferred embodiment of the present invention at the user interface level.

Referring now to FIG. 3, a computer display is designated generally by the numeral 60. Display 60 has displayed thereon a GUI window 61 packed tightly with text entry fields, including a "Name" field 63. A stylus or pen (not shown) is positioned over Name field 63 and its presence is indicated by a pen pointer shape 65. Pen pointer shape 65 is displayed to inform the user that Name field 63 accepts handwriting input.

Figure 4:
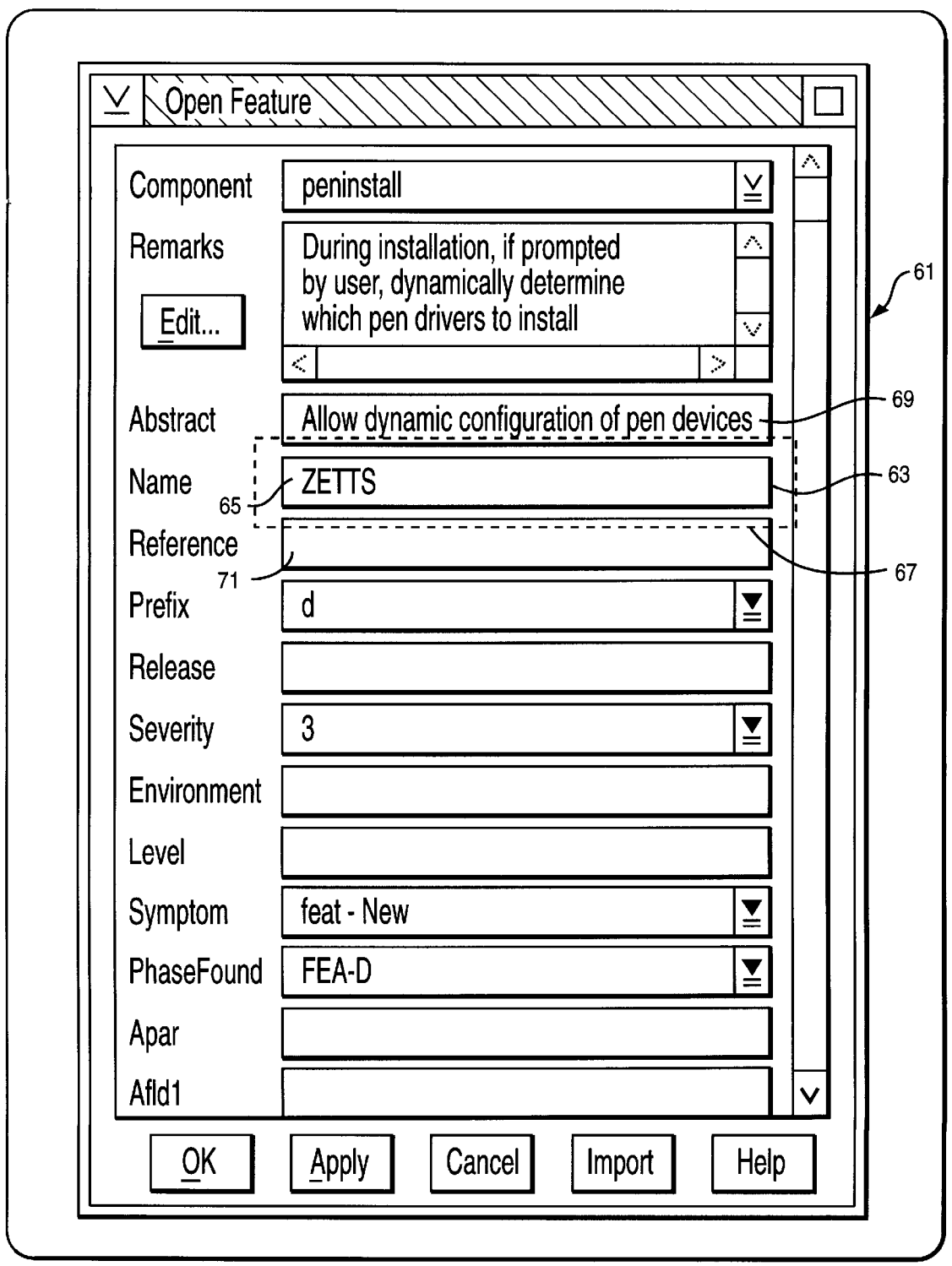

In FIG. 4, a handwritten entry "ZETTS" 65 is shown written into Name field 63. An include rectangle 67 is painted around Name field 63 in dashed lines. It can be seen that include rectangle 67 extends only partially into neighboring "Abstract" field 69 and "Rreference" field 71, which leaves sufficient room for the user to start writing in either field 69 or 71. In addition, pen pointer 65 of FIG. 3 is now no longer visible. Once writing mode has started, the system removes pointer 65 because the flickering of the pointer is distracting to the user.

Figure 5:
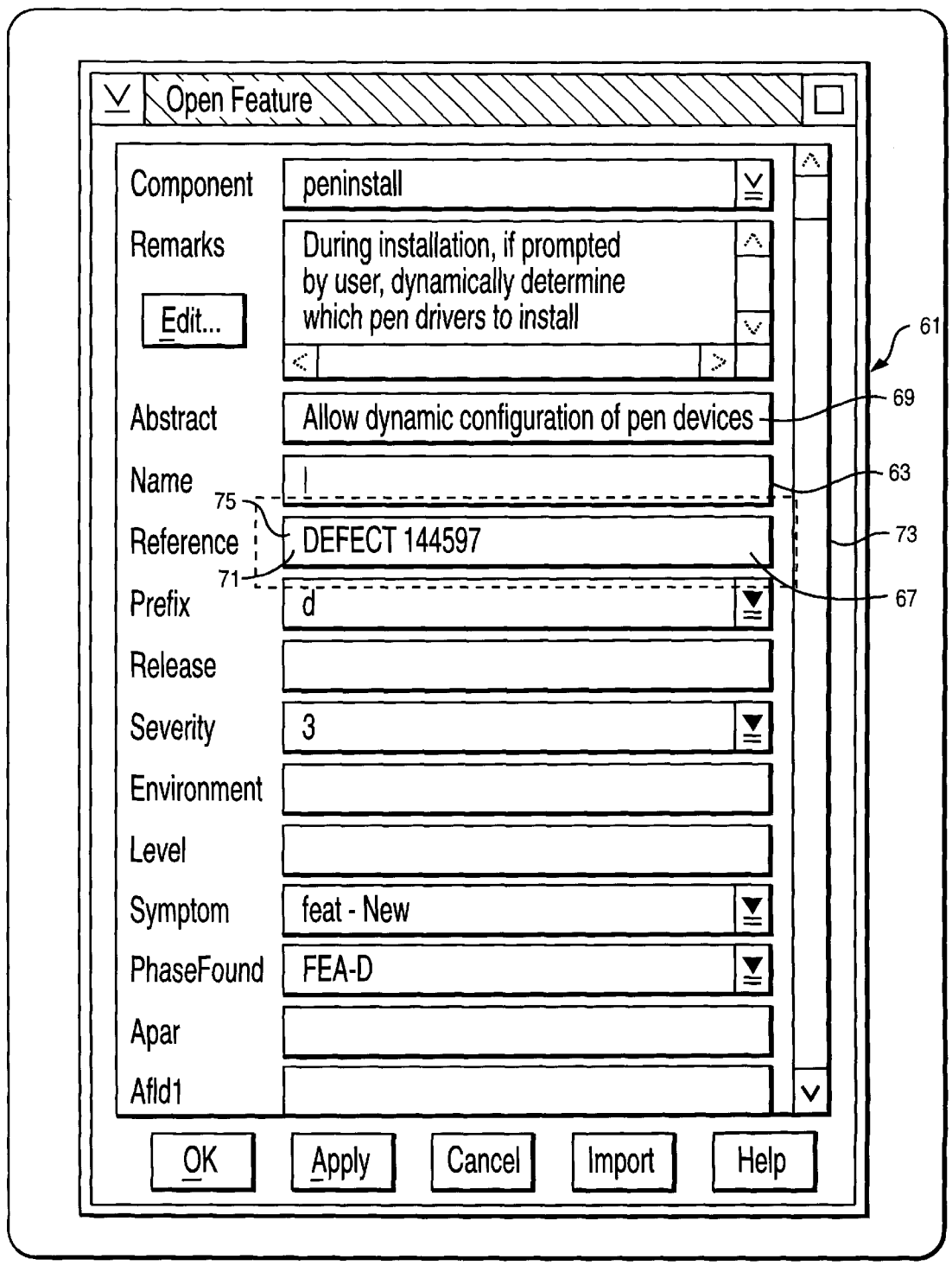

In FIG. 5, the user has moved on to Preference field 71 and written "DEFECT 144597" 75. Since the first stroke of the handwritten input began outside include rectangle 67 of Name field 63 of FIG. 4, include rectangle 67 is removed in FIG. 5 together with the handwriting and a new collection mode was started by painting an include rectangle 73 around Reference field 71. Since recognized text has not yet shown up in Name field 63, it is understood that the text is still undergoing recognition. In the present invention, handwriting recognition is performed at a lower priority so that the processing does not interfere with concurrent handwriting input which is deemed by the pen subsystem as a task of the highest priority.

Figure 6:
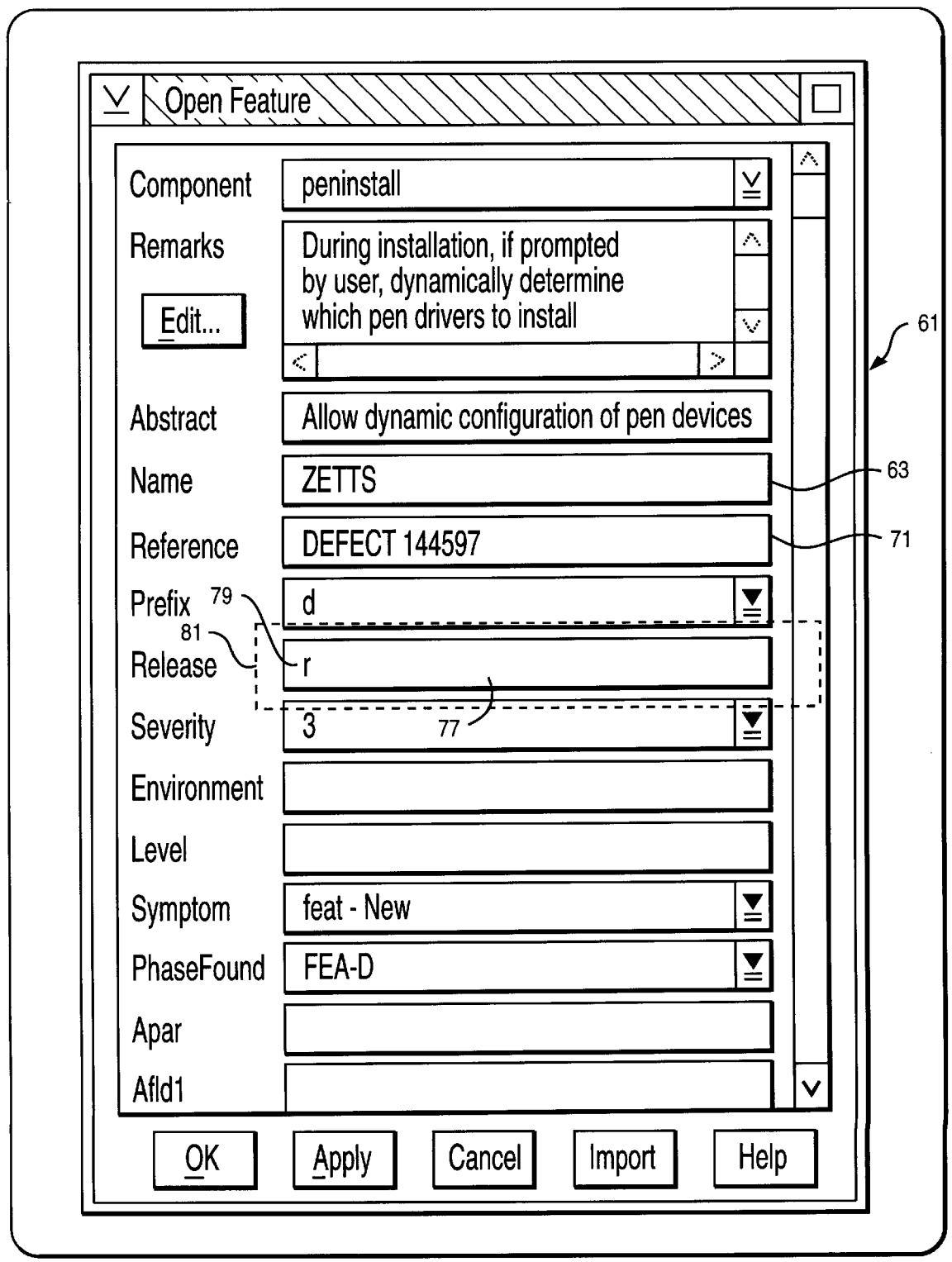

FIG. 6 depicts the recognition results of the stylus input into Name field 63 and Reference field 71. In addition, the user has begun to write into the "Release" field 77. In the preferred embodiment of the invention, only the slightest amount of movement indicated by stroke 79 is required for the system to trigger the painting of an include rectangle 81 around the Release field 77.

Figure 7:
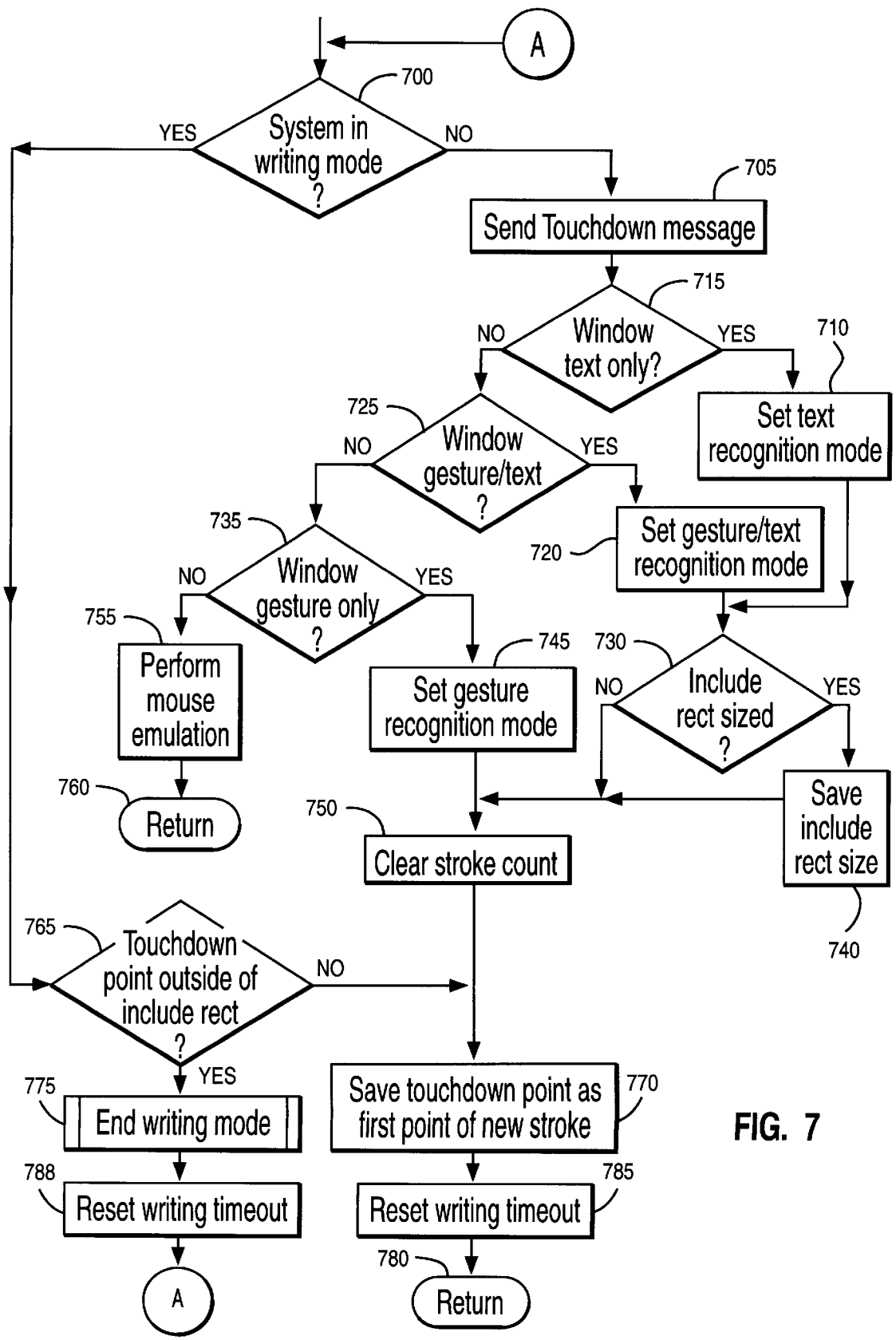
FIG. 7 is a flowchart of the stylus touch down routine of the present invention.

FIG. 7 details the logic invoked when the pen subsystem detects the user has touched down with the stylus. A check is made at decision block 700 to see if the system had previously been put into writing mode. If not, a touchdown message is sent to the application at block 705 to inform it of the touchdown event and allow it to specify how the event is to be handled. During the handling of this message, an application is permitted to specify the size of the include rectangle by calling conventional pen programming interfaces. Upon return from sending the message, a series of tests are made to see if the window under the tip of the stylus should be constrained to text only recognition at decision block 715, gesture or text recognition at decision block 725, or gesture only recognition at decision block 735. The pen subsystem determines this on behalf of pen-unaware applications using various criteria but an aware application would have also specified which type of recognition to use during the processing of the touchdown message.

In operations 710, 720 and 730, the system sets up text, gesture/text and gesture only modes of recognition, respectively. If the mode of recognition includes text, a test is made at decision block 730 to see if the application may have specified the include rectangle size. If so, the size is saved at block 740 to be used later. In some cases, all recognition may be disabled in the touchdown window in which case the system simply treats the touchdown event as a mouse button event at block 755 and returns at block 760. Otherwise, the system prepares for incoming strokes by clearing the stroke count at block 750, saving the touchdown coordinate as the first point of the first stroke at block 770, and resetting the writing timeout at block 785. The routine then returns at block 780 to await further stylus input.

Figure 8:
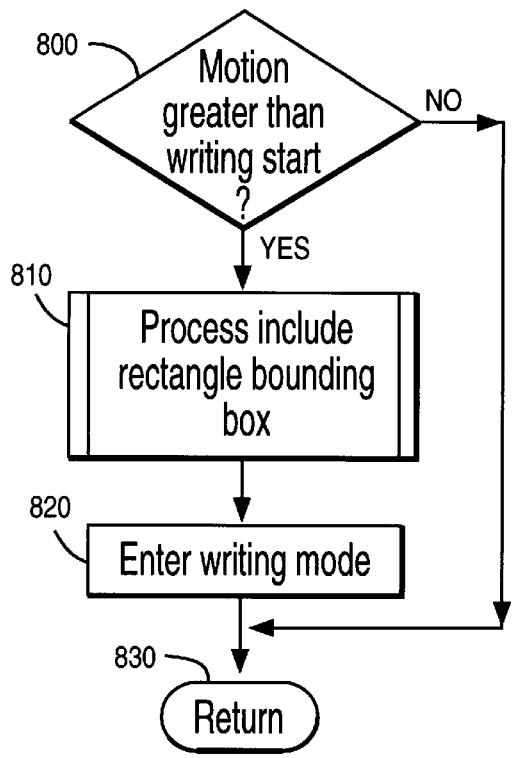
FIG. 8 is a flowchart of the pen motion routine of the present invention.

Referring now to FIG. 8, a routine is invoked each time movement of the stylus is detected while the stylus is in contact with the digitizing sensor. Movement of the stylus is measured from the initial touchdown point to determine if the user has started to write at decision block 800. If the motion is insufficient, typically less than 0.01 inches, the routine returns at block 830. Otherwise, the movement is of sufficient length to assume the user intends to write with the stylus and the include rectangle is processed as indicated generally at block 810. The system then enters writing mode at block 820 which will handle all incoming strokes until the user stops writing.

Figure 9:
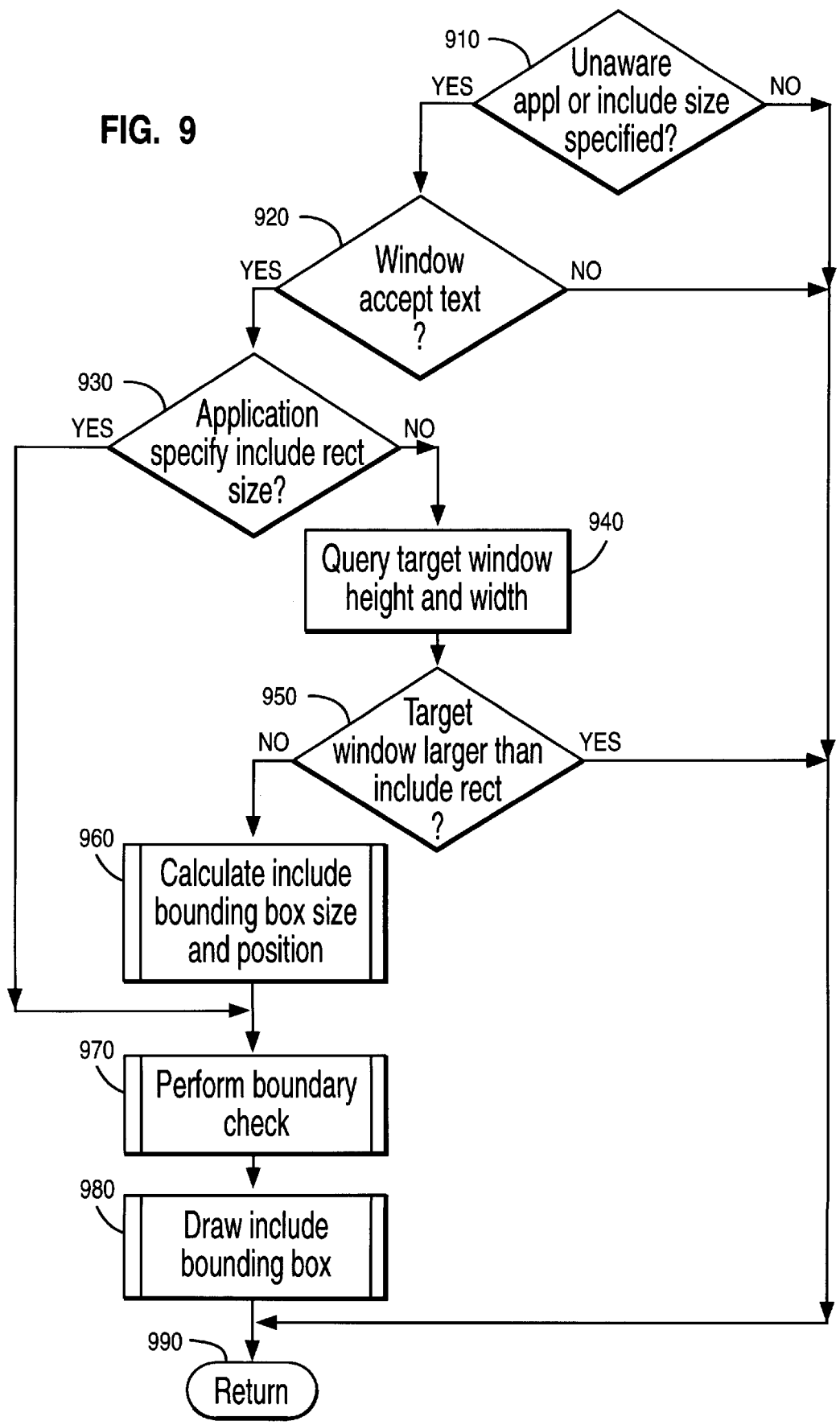
FIG. 9 is a flowchart of the process include rectangle bounding box routine of the present invention.

Referring to FIG. 9, in processing the include rectangle, the system first checks, at decision block 910, to see if the target application is either pen-unaware or, if it is aware, whether it has specified the size of the include rectangle. It should be noted that if the application specified an include rectangle size of zero to suppress the include rectangle, the test at decision block 910 will fail and no include rectangle will be displayed. Next, the system performs a test at decision block 920 to see if the current recognition mode is enabled for text. The include rectangle is painted only if the user will be writing text. If text is not enabled, the routine returns at block 990. Else the system checks at decision block 930 to see if the application has specified the include rectangle size. If so, the size is passed through a boundary check routine at block 970 to ensure the rectangle stays visible and the include rectangle bounding box is drawn at block 980. If the application did not specify the size at decision block 930, the size of the target window is queried at block 940 and the system checks at decision block 950 to determine if the target window is smaller than the include rectangle size. If the window is larger in both axes, there is sufficient room to write text in the window and the routine returns at block 990. Else, the size and position of the include rectangle is calculated at block 960, a boundary check is made on the resultant rectangle at block 970 and the include rectangle bounding box in drawn at block 980.

The include rectangle is defined by two Cartesian coordinates, (xLeft and yBottom) and (xRight, yTop), located in opposite corners of the rectangle, where (Xleft, Ybottom) is also the rectangle's origin point. The size of the include rectangle is user settable to account for the person-to-person variability in size of hand printed characters. The size of the include rectangle is specified in inches and at system boot time and any time the user changes the include rectangle size the settings are converted from inches to display pels. The default size is 4.0 inches in width by 0.5 inches in height. Using inches to specify the rectangle size instead of pels ensures that the include rectangle will be the same size regardless of display type or size.

Figure 17:
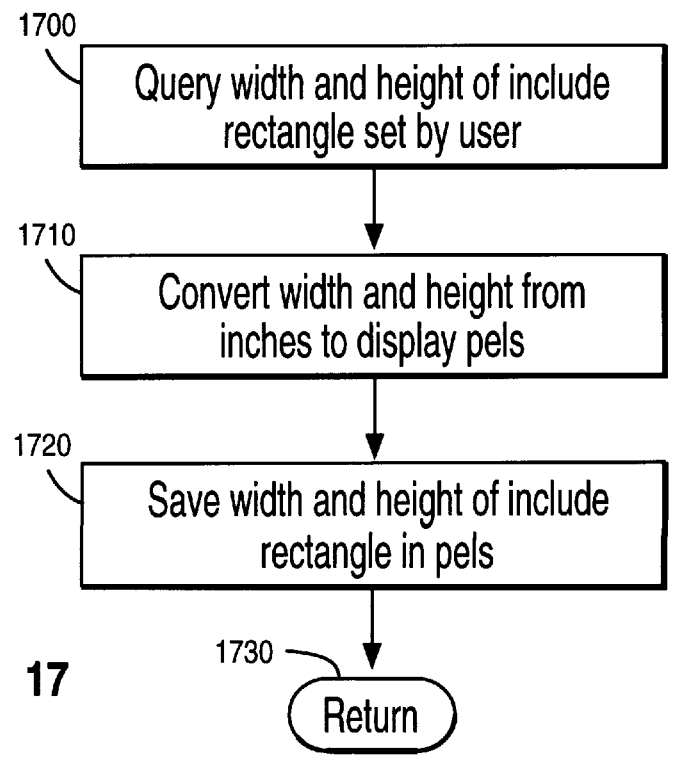
FIG. 17 is a flowchart of the initialize include rectangle size routine of the present invention.

Referring to FIG. 17, the width and height of the include rectangle are queried at block 1700 and converted to display pels at block 1710. The pen extension has a programming interface that accurately converts inches to pels and pels to inches. The results are saved in at block 1720 and the system returns at block 1730.

Figure 10:
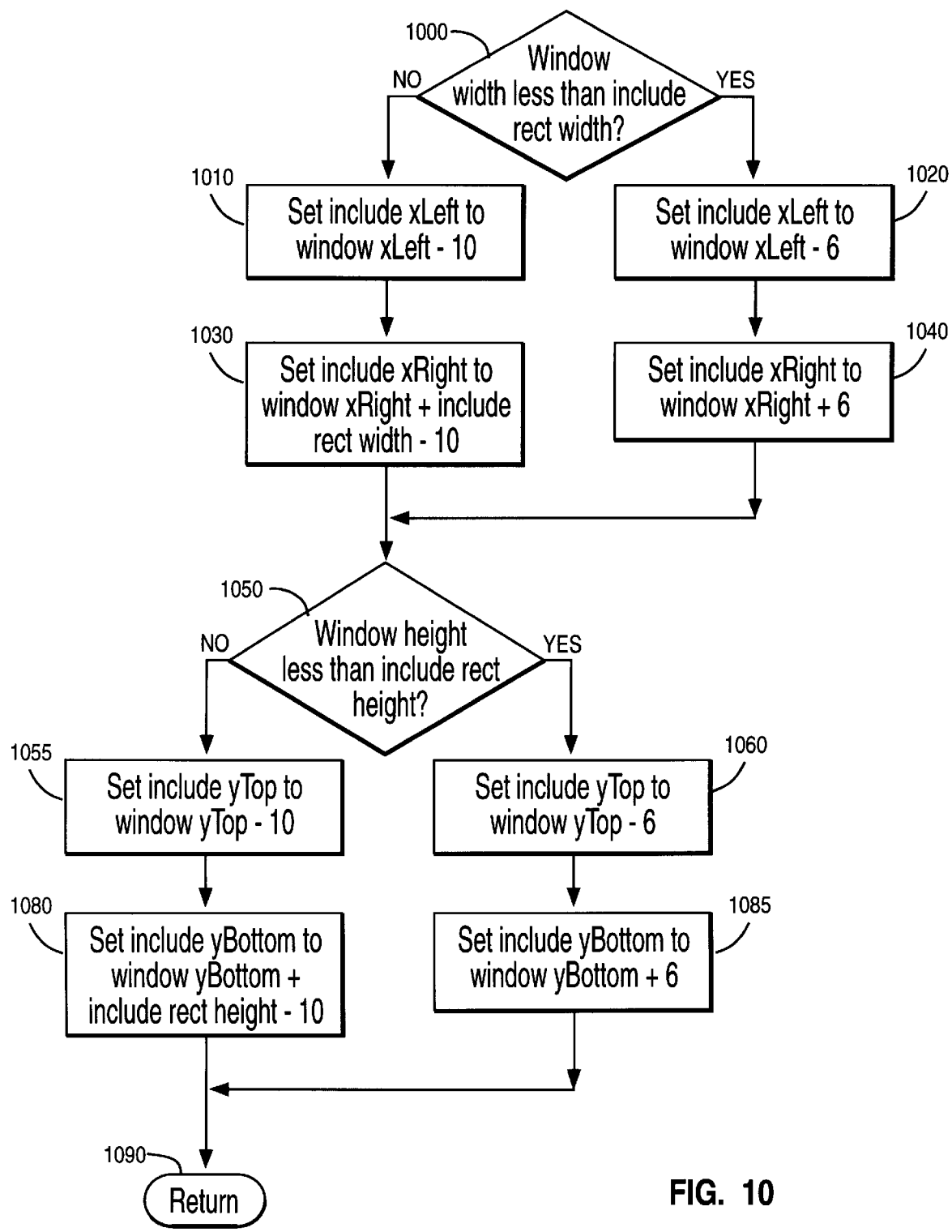
FIG. 10 is a flowchart of the calculate include bounding box size and position routine of the present invention.

Referring now to FIG. 10, when calculating the size and position of the include rectangle, the X axis of the target entry field is first checked against the width of the include rectangle width, which in the default condition is 4.0 inches, at decision block 1000. If the target entry field is less wide than the include rectangle, the left boundary of the include rectangle is positioned 10 pels to the left of the left boundary of the target entry field at block 1010 and the right boundary is positioned to the right a distance equal to the width of the include rectangle in pels—10 pels at block 1030.

Positioning the left boundary of the include rectangle further to the left by 10 pels makes the include rectangle easier to see since it does not get superimposed over the frame of the window. In addition, it allows the user to position the second stroke of the first character to the left of first character. Crossing a 'T' is a good example of the second stroke originating to the left of the first stroke. If the include rectangle was drawn too close to the down stroke of the 'T', the touchdown point of the crossbar would land outside the include rectangle causing stroke collection to terminate prematurely.

If the X axis of the target entry field is wider than the width of the include rectangle at decision block 1000, the include rectangle is still inflated by 6 pels on both the left and right sides at blocks 1020 and 1040, respectively, to keep the vertical lines of the rectangle from falling on the frame of the target entry field and being obscured. At decision block 1050, the height of the target entry field is compared against the height of the include rectangle. Similar to the X axis processing, the top boundary is raised 10 pels at block 1055 and the bottom boundary is lowered an amount equal to the height of the include rectangle—10 pels at block 1080. If the height of the target window is greater than the height of the include rectangle, the top and bottom boundaries are adjusted outward by 10 pels at blocks 1060 and 1085, respectively. The routine then returns at block 1090.

Figure 11:
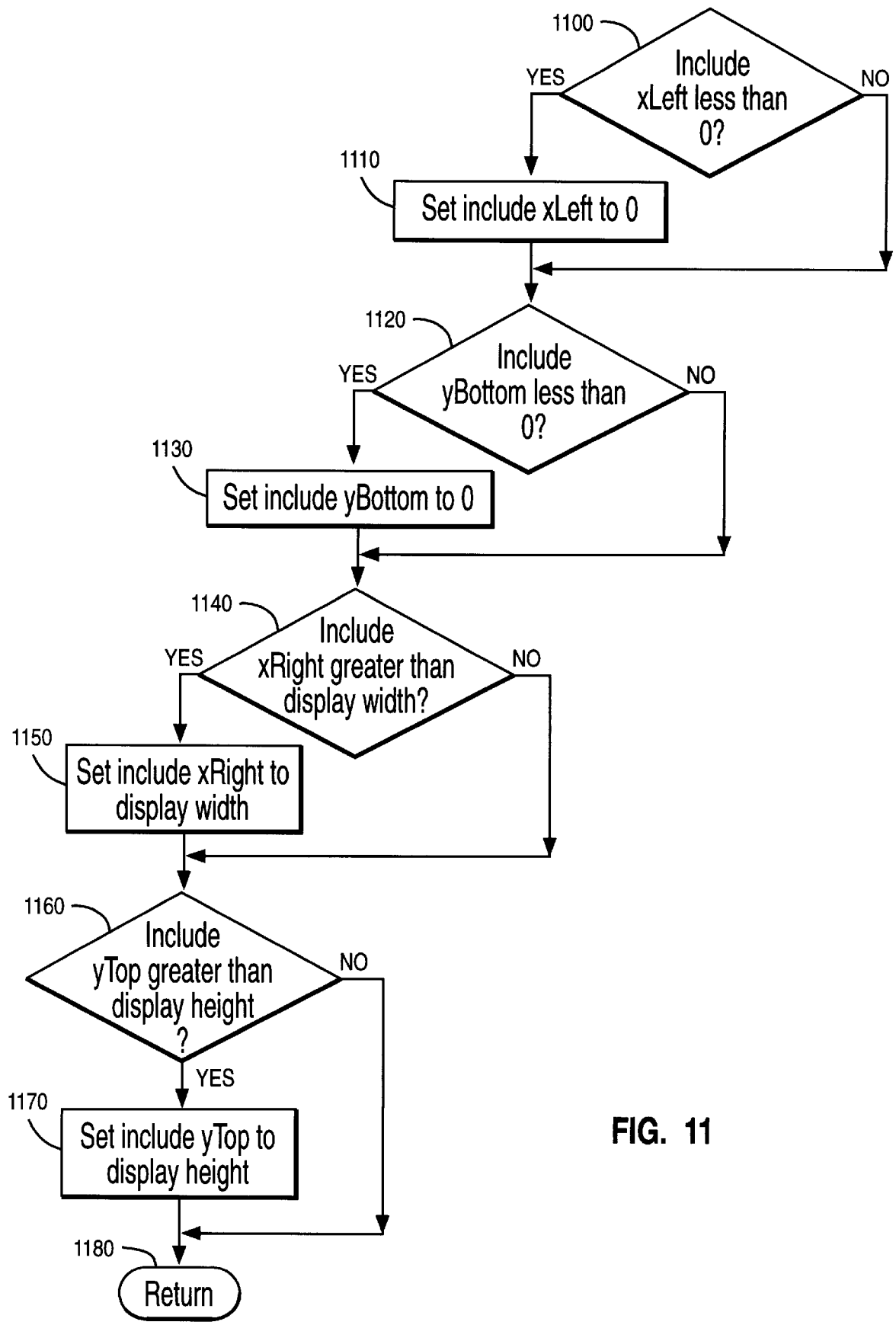
FIG. 11 is a flowchart of the perform boundary check routine of the present invention.

FIG. 11 depicts the boundary checking routine to ensure the include rectangle stays within the visible region of the display. The system checks at decision blocks 1100 and 1120 for a negative value for either the X or Y axis, respectively. Any negative axis is reset to zero at blocks 1110 and 1130. The include rectangle is then checked to see if the right boundary, at decision block 1140, or the top boundary, at decision block 1160, is greater than the maximum extent of the display. If so, the values are reset to the respective maximum value at blocks 1150 and 1170.

Figure 12:
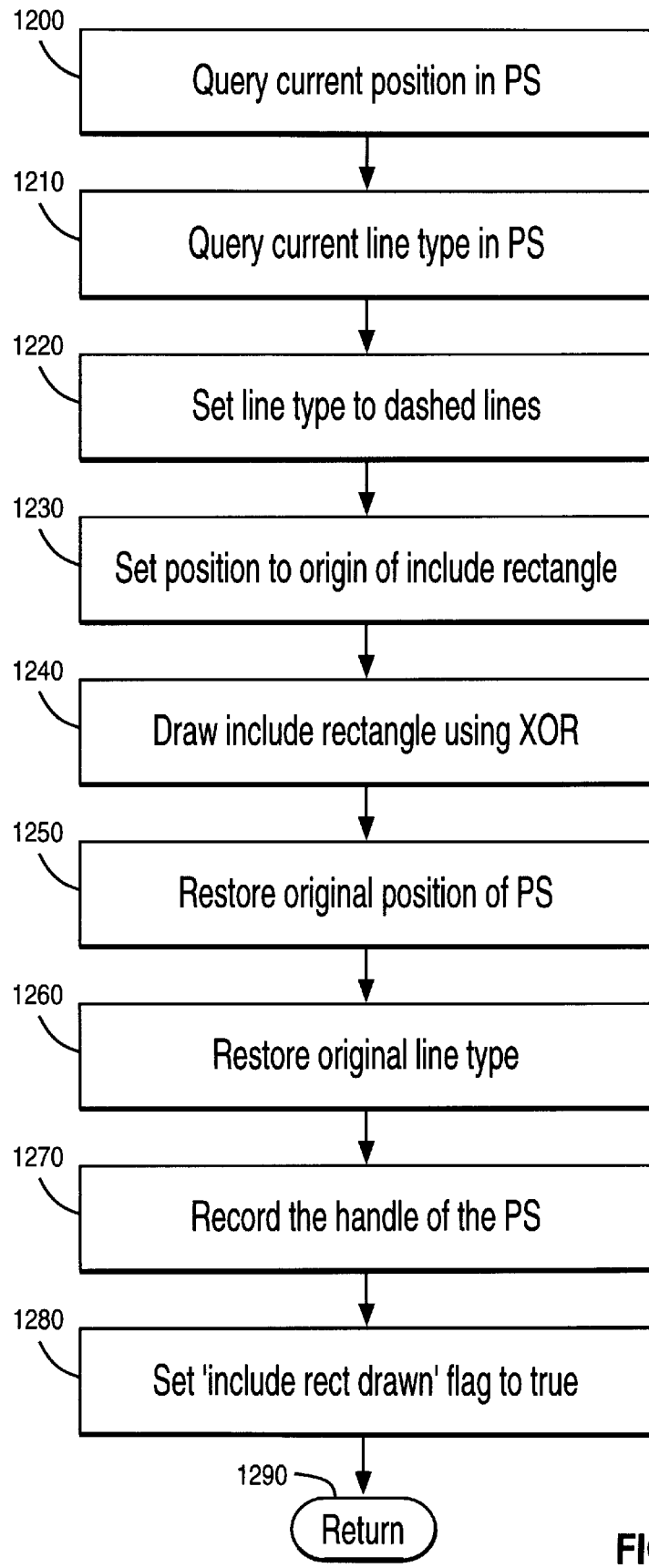
FIG. 12 is a flowchart of the draw include bounding box routine of the present invention.

The final step in processing the include rectangle is the actual painting onto the display, which is shown in FIG. 12. It must be understood that the pen extension is operating in the context of the target application and as such must ensure that any paint operation or alteration of the display image be non-interfering with the application itself. The preferred OS/2 operating system employs a presentation space (PS) to manage and control all paint operations and attributes of an application window. In operations 1200 and 1210, the current position and line type in the PS are queried so that they may be later restored. Then the current position is set to the origin of the include rectangle at block 1230, the line type is changed to dashed lines at block 1220 and the rectangle is drawn using an XOR raster operation at block 1240 to allow the underlying image to be completely restored later. The position and line type are then restored at blocks 1250 and 1260, respectively, and the PS handle used to paint is recorded at block 1270. A system flag is subsequently set to schedule the removal of the include rectangle at the completion of writing mode at block 1280.

Figure 13:
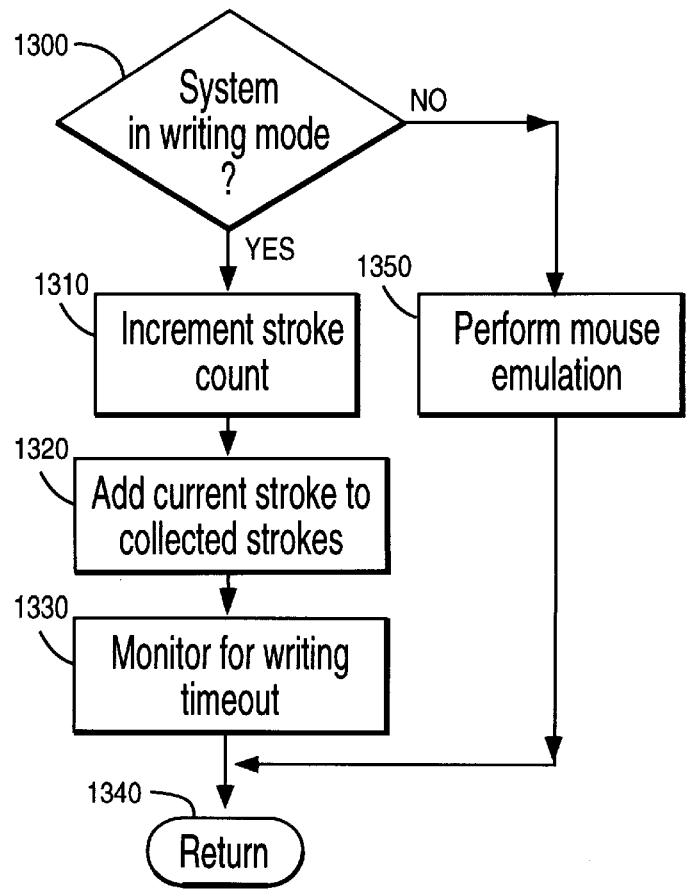
FIG. 13 is a flowchart of the stylus lift off routine of the present invention.

At this point the user continues to draw the first stroke of the first character. Referring to FIG. 13, when the user finally lifts off, the system checks at decision block 1300 to see if the system is in writing mode. If so, the stroke count is incremented at block 1310, the current stroke is added to the collection of strokes at block 1320 and the system begins to monitor for a writing timeout, typically 3 seconds, at block 1330. The lack of stylus input for 3 seconds signals the completion of user input.

Figure 14:
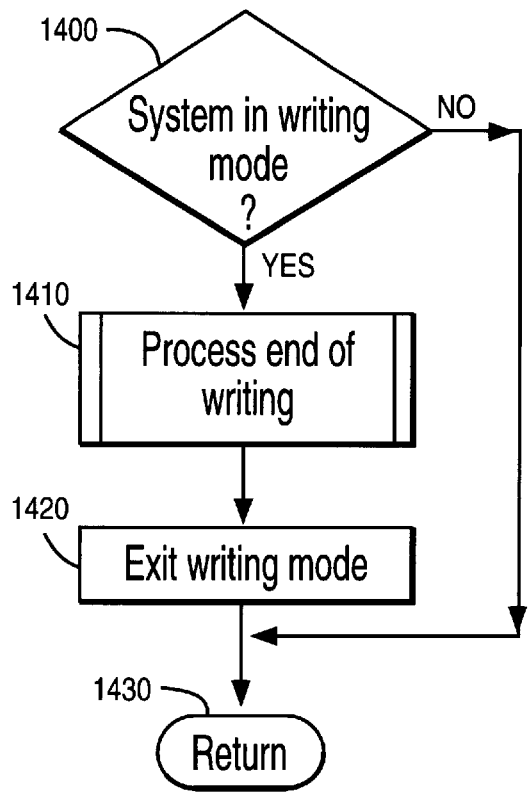
FIG. 14 is a flowchart of the writing timeout routine of the present invention.

Referring to FIG. 14, when a writing timeout occurs, if the system is in writing mode at decision block 1400, the end of writing is processed at block 1410 and writing mode is then exited 1420.

Figure 15:
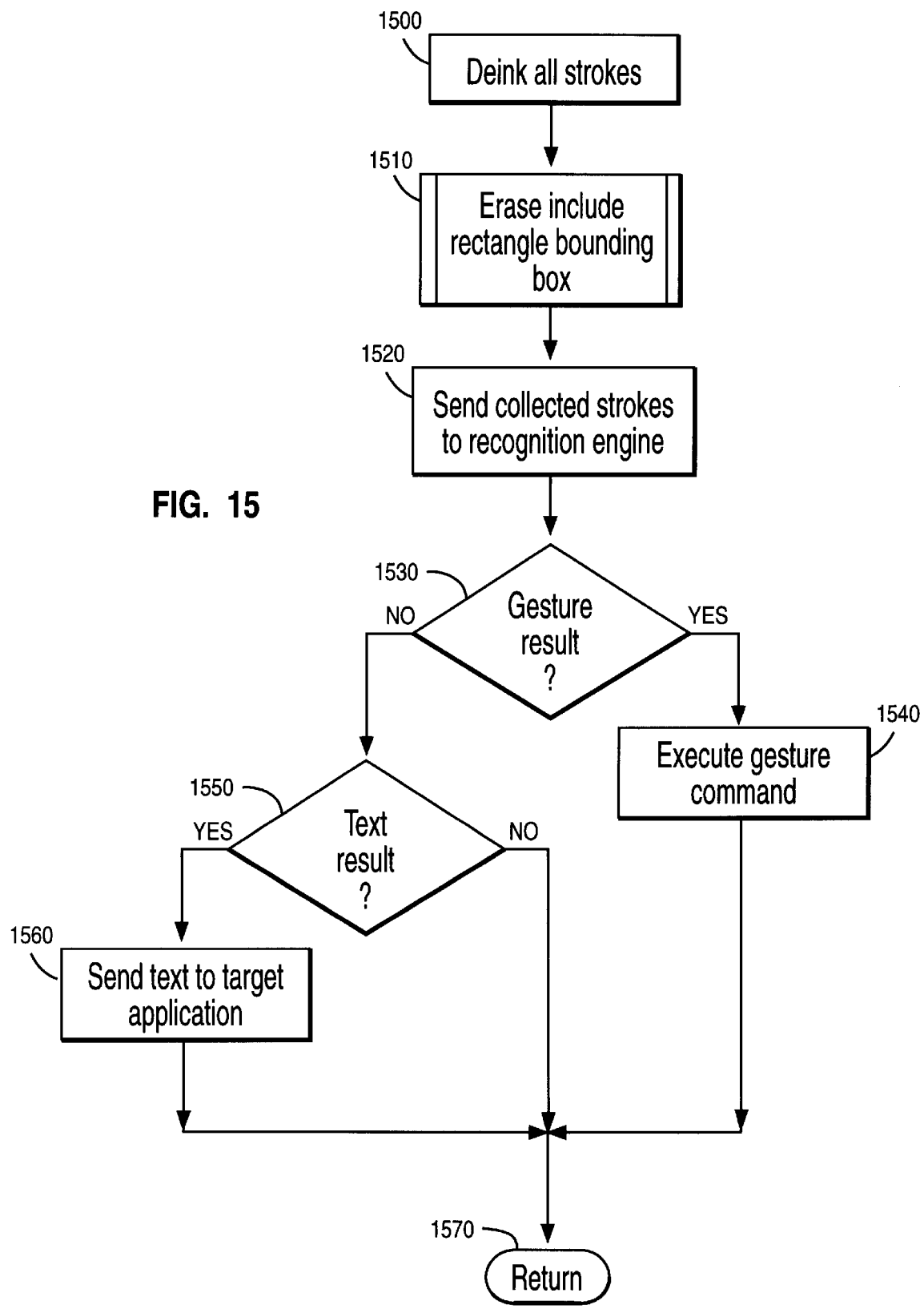
FIG. 15 is a flowchart of the process end of writing routine of the present invention.

FIG. 15 illustrates the end of writing logic flow. The system de-inks all stokes from the display at block 1500. Then the include rectangle is removed at block 1510 and all collected strokes are sent to the recognition engine at block 1520. If the recognition result is a gesture at decision block 1530, the gesture is executed at block 1540. If the result is text at decision block 1550, the most common result, the text string is sent to the application at block 1560 in a manner that makes the characters appear as if they were generated by the keyboard. If the recognition results were null, the routine simply returns at block 1570 taking no further action.

Figure 16:
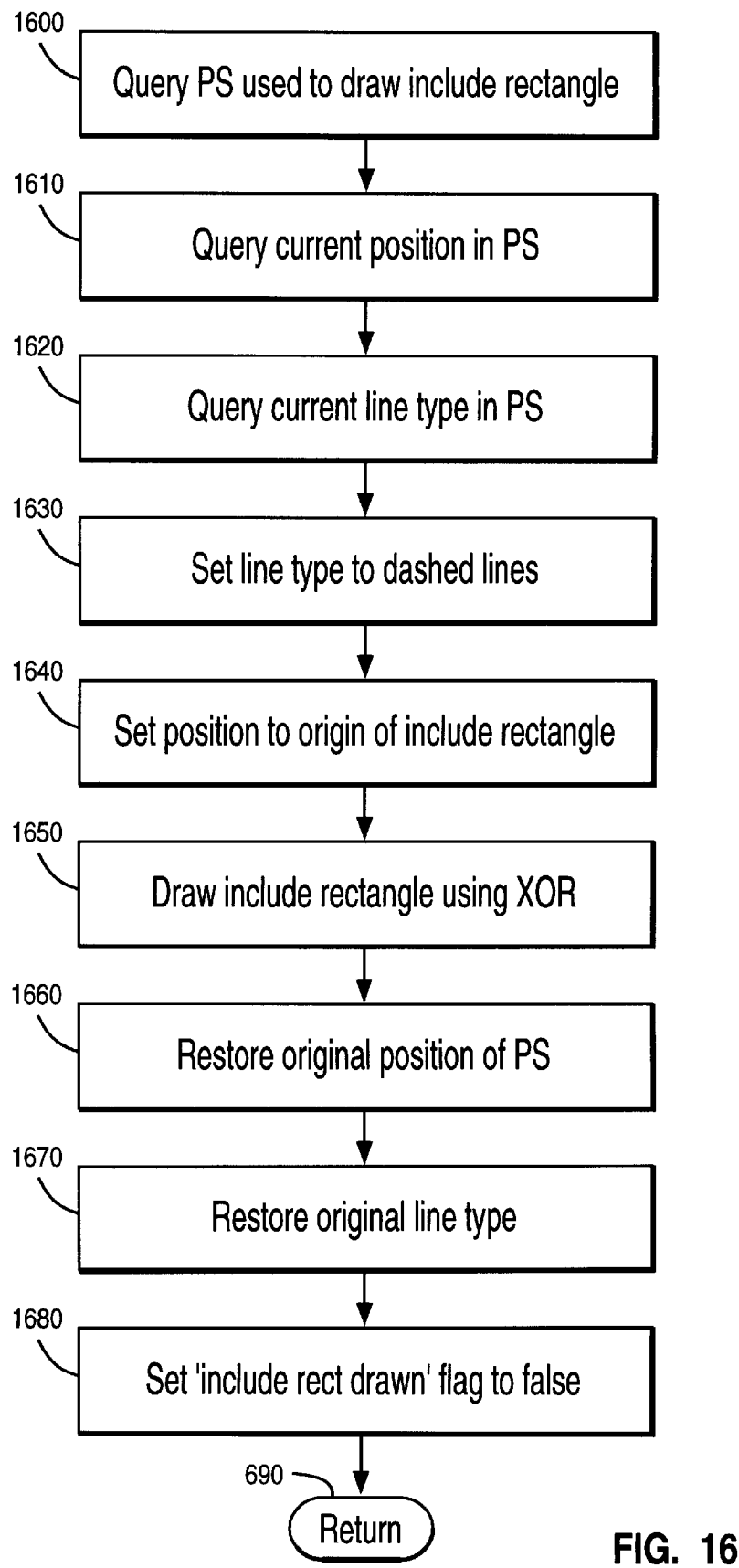
FIG. 16 is a flowchart of the erase include bounding box routine of the present invention.

Referring to FIG. 16, removing or erasing the include rectangle employs the same steps and painting it. First the handle of the PS used to paint it is queried at block 1600. Then the current position 1610 in the PS is queried at block 1610. Finally, the line type again queried at block 1620. After setting the dashed line type at block 1630 and the drawing position at block 1640, the include rectangle is redrawn using an XOR operation at block 1650, which this time effectively restores the underlying image. The PS position and line type are again restored, at blocks 1660 and 1670, and the system flag 'include rect drawn' is changed to false at block 1680.

Referring again to FIG. 7, if after liftoff, the user again touches down to continue writing, the test for writing mode in operation at decision block 700 tests true and the touchdown point is examined at decision block 765 to see if it occurred outside the include rectangle. If it did occur outside the include rectangle, writing mode is ended at block 775 and the routine is reentered to handle the touchdown as the first point of the first stroke again. As long as the touchdown point of each stroke remains inside the include rectangle at decision block 765, new strokes will continued to be collected at block 770. As each new stroke is started, the writing timeout is reset at block 785.

From the foregoing it may be seen that the invention provides an include rectangle as a visual indicator around the target entry field or window. Any pen stroke starting outside the include rectangle is not included in the current collection of strokes and will in fact terminate the current mode and start a new mode of stroke collection. The user however is free to extend handwriting outside the include rectangle and may even end strokes outside the area. All writing outside the include rectangle is completely inked.

The include rectangle is provided only if the target window is enabled for text input. It is painted as a dashed box around the target area in an XOR operation so that the paint may be removed without leaving behind any paint and so the box does not obscure any text surrounding the field. The size of the include rectangle is user settable to account for different size handwriting, but the default size is 0.50 inches high by 4.0 inches wide. If either the X or Y axis of the target area is already that size or greater, that axis is not inflated. The include rectangle is suppressed if both axes are larger than the default size.

When the include rectangle is enabled, it is displayed immediately once it has been determined that the user has the intention of writing directly into the window. By monitoring the movement of the pen, the pen software can distinguish mouse operations (i.e. navigation and text marking) from handwriting input. By touching down and moving sixty-four thousandths of an inch within 300 milliseconds, the user signals the start of handwriting and the include rectangle is immediately displayed. This is an important feature because displaying the include rectangle when the user has no intention of writing would be very distracting and a huge load on the CPU. What the user sees is the target window inflating under the stylus after the first stroke has reached a length of ⅒ inch.

Performance plays an important role in providing the include rectangle because painting the include rectangle cannot interfere with or delay painting ink from the tip of the pen as it is moved by the user.

The size of the include rectangle is a trade off between providing the user adequate writing area and blocking other entry fields in the window. The intent is to allow the user to move quickly from field to field writing in input. If the next field in the menu is covered by the include rectangle of the adjoining text field, the user will not be able to start a new mode by writing into that field. The user would be forced to either exit proximity to end the mode or to move to another text field that is not covered by the include rectangle.

As soon as the user touches outside the include rectangle, the include rectangle and the inked strokes are removed (unpainted) and the collected strokes are sent to the handwriting recognition engine for processing. If, in conjunction with touching down, the user starts writing again, the include rectangle is painted and the system reenters handwriting mode. Note that this behavior applies to both pen-aware and pen-unaware applications, however the pen-aware application can specify the include rectangle dimensions via system function calls.

Given the multitasking nature of pen-based systems, recognition results of handwriting collected from a series of windows may be pending during which time the user is free to continue to write more input as input runs at a higher priority than recognition. As recognition results become available, they are routed to the target window in the form of character messages as if they were generated by the keyboard. The displaying of these characters is interleaved with the user writing into windows in a non-interfering manner.

Although a specific embodiment has been disclosed, it will be understood by those skilled in the art that changes can be made to this specific embodiment without departing from the spirit and scope of the invention. Furthermore, this embodiment is for the purpose of example and illustration only and is not to be taken to limit the scope of the invention or narrow the scope of the appended claims.

What is claimed is:

1. A method of facilitating stylus input into a text entry field in a pen-based computer system, which comprises the computer implemented steps of:
    detecting a touch down of said stylus;
    determining whether said touch down of said stylus is in a text entry field;
    determining the size of said text entry field;
    if said text entry field is less than a predetermined size and in response to detecting movement of said stylus in said text entry field greater than a threshold, drawing an include rectangle around said text entry fields, said include rectangle being of substantially said predetermined size.

2. The method as claimed in claim 1, including the computer implemented step of:
    whenever the size of said text entry field is not less than said predetermined size, suppressing said include rectangle.

3. The method as claimed in claim 1, wherein said predetermined size is user settable.

4. The method as claimed in claim 1, including the computer implemented step of:
    interpreting any stroke of said stylus starting within said include rectangle as an input to said text entry field.

5. The method as claimed in claim 1, including the computer implemented step of:
    erasing said include rectangle in response to detection of a touch down of said stylus outside said include rectangle.

6. The method as claimed in claim 1, including the computer implemented step of:
    interpreting any stroke of said stylus starting within said include rectangle within a predetermined timeout period as an input to said text entry field.

7. The method as claimed in claim 6, including the computer implemented step of:
    erasing said include rectangle in response to the expiration of said timeout period without detection of a stroke starting within said include rectangle.

8. The method as claimed in claim 1, including the computer implemented step of:
    inking any stroke of said stylus starting within said include rectangle.

9. A method of facilitating stylus input into a text entry field in a pen-based computer system, which comprises the computer implemented steps of:
    detecting a touch down of said stylus in a text entry field;
    whenever the size of said text entry field is less than a predetermined size, drawing an include rectangle around said text entry field, said include rectangle being of substantially said predetermined size;
    whenever the size of said text entry field is not less than a predetermined size, suppressing said include rectangle; and,
    interpreting any stroke of said stylus starting within said include rectangle as an input to said text entry field.

10. The method as claimed in claim 9, including the computer implemented step of:
    erasing said include rectangle in response to detection of a touch down of said stylus outside said include rectangle.

11. The method as claimed in claim 9, including the computer implemented step of:
    erasing said include rectangle in response to the expiration of a predetermined timeout period without detection of a stroke of said stylus starting within said include rectangle.

12. The method as claimed in claim 9, wherein said predetermined size is user settable.

13. A method of facilitating stylus input in a pen-based computer system, which comprises the computer implemented steps of:
    detecting a touch down of said stylus;
    determining whether said touch down is in a text entry field;
    determining whether said pen-based computer system is in writing mode;
    in response to detecting movement of said stylus in said text entry field when said pen-based system is not in writing mode,
    determining the x-axis size of said text entry field,
    determining the y-axis size of said text entry field,
    calculating a size of an include rectangle based upon said x-axis size and said y-axis size,
    drawing said include rectangle around said text entry field if at least one of said x-axis and said y-axis is less than a predetermined size, and
    placing said pen-based computer system in writing mode.

14. The method as claimed in claim 13, wherein said step of calculating a size of an include rectangle based on said x-axis size and said y-axis size includes the computer implemented steps of:
    whenever said x-axis size of said text entry field is less than a predetermined x-axis size, sizing the x-axis of said include rectangle substantially equal to said predetermined x-axis size; and,
    whenever said y-axis size of said text entry field is less than a predetermined y-axis size, sizing the y-axis of said include rectangle substantially equal to said predetermined y-axis size.

15. The method as claimed in claim 14, wherein said step of calculating a size of an include rectangle based on said x-axis size and said y-axis size includes the computer implemented step of:

whenever said x-axis size of said text entry field is not less than a predetermined x-axis size, sizing the x-axis of said include rectangle substantially equal to said x-axis size of said text entry field.

16. The method as claimed in claim 14, wherein said step of calculating a size of an include rectangle based on said x-axis size and said y-axis size includes the computer implemented step of:

whenever said y-axis size of said text entry field is not less than a predetermined y-axis size, sizing the y-axis of said include rectangle substantially equal to said y-axis size of said text entry field.

17. The method as claimed in claim 13, including the computer implemented step of:

whenever both said x-axis size and said y-axis size of said text entry field are larger than said predetermined x-axis and y-axis sizes, suppressing said include rectangle.

18. The method as claimed in claim 13, including the computer implemented step of:

interpreting any stroke of said stylus starting within said include rectangle as an input to said text entry field.

19. The method as claimed in claim 14, wherein said predetermined x-axis and y-axis sizes are each user settable.

20. A system for facilitating stylus input into a text entry field in a pen-based computer system, which comprises:

means for detecting a touch down of said stylus;

means for determining whether said touch down of said stylus is in a text entry field;

means for determining the size of said text entry field;

means, responsive to determining said text entry field is less than a predetermined size and detecting movement of said stylus in said text entry field greater than a threshold, for drawing an include rectangle around said text entry field, said include rectangle being of substantially said predetermined size.

21. The system as claimed in claim 20, including:

means for suppressing, whenever the size of said text entry field is not less than said predetermined size, said include rectangle.

22. The system as claimed in claim 20, including:

means for interpreting any stroke of said stylus starting within said include rectangle as an input to said text entry field.

23. The system as claimed in claim 20, including:

means for erasing said include rectangle in response to detection of a touch down of said stylus outside said include rectangle.

24. The system as claimed in claim 20, including:

means for interpreting any stroke of said stylus starting within said include rectangle within a predetermined timeout period as an input to said text entry field.

25. The system as claimed in claim 24, including:

means for erasing said include rectangle in response to the expiration of said timeout period without detection of a stroke starting within said include rectangle.

26. The system as claimed in claim 20, including:

means for inking any stoke of said stylus starting within said include rectangle.

27. A system for facilitating stylus input into a text entry field in a pen-based computer system, which comprises:

means for detecting a touch down of said stylus in a text entry field;

means for drawing, whenever the size of said text entry field is less than a user settable predetermined size, an include rectangle around said text entry field, said include rectangle being of substantially said predetermined size;

means for suppressing, whenever the size of said text entry field is not less than said user settable predetermined size, said include rectangle; and, means for interpreting any stroke of said stylus starting within said include rectangle as an input to said text entry field.

28. The system as claimed in claim 27, including:

means for erasing said include rectangle in response to detection of a touch down of said stylus outside said include rectangle.

29. The system as claimed in claim 27, including:

means for erasing said include rectangle in response to the expiration of a predetermined timeout period without detection of a stroke of said stylus starting within said include rectangle.

30. A method of facilitating stylus input in a pen-based computer system, which comprises the computer implemented steps of:

means for detecting a touch down of said stylus;

means for determining whether said touch down is in a text entry field;

means for determining whether said pen-based computer system is in writing mode;

means responsive to detecting movement of said stylus in said text entry field when said pen-based system is not in writing mode, for determining the x-axis size of said text entry field,
for determining the y-axis size of said text entry field,
for calculating a size of an include rectangle based upon said x-axis size and said y-axis size,
for drawing said include rectangle around said text entry field if at least one of said x-axis and said y-axis is less than a predetermined size, and
placing said pen-based computer system in writing mode.

31. The system as claimed in claim 30, wherein said means for calculating a size of an include rectangle based on said x-axis size and said y-axis size includes:

means for sizing, whenever said x-axis size of said text entry field is less than a user settable predetermined x-axis size, the x-axis of said include rectangle substantially equal to said predetermined x-axis size; and, means for sizing, whenever said y-axis size of said text entry field is less than a user settable predetermined y-axis size, the y-axis of said include rectangle substantially equal to said predetermined y-axis size.

32. The system as claimed in claim 30, wherein said means for calculating a size of an include rectangle based on said x-axis size and said y-axis size includes:

means for sizing, whenever said x-axis size of said text entry field is not less than a predetermined user settable x-axis size, the x-axis of said include rectangle substantially equal to said x-axis size of said text entry field.

33. The system as claimed in claim 30, wherein said means for calculating a size of an include rectangle based on said x-axis size and said y-axis size includes:

means for sizing, whenever said y-axis size of said text entry field is not less than a predetermined y-axis size, the y-axis of said include rectangle substantially equal to said y-axis size of said text entry field.

34. The system as claimed in claim 30, including:

means for suppressing said include rectangle whenever both said x-axis size and said y-axis size of said text entry field are larger than said predetermined x-axis and y-axis sizes.

35. The system as claimed in claim 30, including:

means for interpreting any stroke of said stylus starting within said include rectangle as an input to said text entry field.

36. A method of facilitating stylus input into a text entry field in a pen-based computer system, which comprises the computer implemented steps of:

detecting a touch down of said stylus in a text entry field; and, if said text entry field is less than a predetermined size and in response to detecting movement of said stylus in said text entry field, drawing an include rectangle around said text entry field, said include rectangle being of substantially said predetermined size.

37. The method as claimed in claim 36, including the computer implemented step of:

if said text entry field is not less than said predetermined size and in response to detecting movement of said stylus in said text entry field, suppressing said include rectangle.

38. A method of facilitating stylus input in a pen-based computer system, which comprises the computer implemented steps of:

detecting a touch down of said stylus; and, if said touch down is in a text entry field, determining the x-axis size of said text entry field, determining the y-axis size of said text entry field, calculating a size of an include rectangle based upon said x-axis size and said y-axis size, and drawing said include rectangle around said text entry field if at least one of said x-axis and said y-axis is less than a predetermined size.

* * * * *

UNITED STATES PATENT AND TRADEMARK OFFICE
CERTIFICATE OF CORRECTION

PATENT NO. : 6,049,329
DATED : April 11, 2000
INVENTOR(S) : Zetts et al.

It is certified that error appears in the above-identified patent and that said Letters Patent is hereby corrected as shown below:

Column 4, line 58, please change ""Rreference"" to -"Reference"-.

Signed and Sealed this

Thirteenth Day of March, 2001

Attest:

NICHOLAS P. GODICI

Attesting Officer    Acting Director of the United States Patent and Trademark Office